(12) United States Patent
Cussac

(10) Patent No.: US 9,513,494 B2
(45) Date of Patent: Dec. 6, 2016

(54) METHOD FOR MANUFACTURING A CORRECTIVE OPHTHALMIC GLASSES LENS PERSONALISED FOR A WEARER

(71) Applicant: ESSILOR INTERNATIONAL (COMPAGNIE GENERALE D'OPTIQUE), Charenton le Pont (FR)

(72) Inventor: Laurent Cussac, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/384,225

(22) PCT Filed: Mar. 19, 2013

(86) PCT No.: PCT/FR2013/050582
§ 371 (c)(1),
(2) Date: Sep. 10, 2014

(87) PCT Pub. No.: WO2013/140086
PCT Pub. Date: Sep. 26, 2013

(65) Prior Publication Data
US 2015/0049304 A1    Feb. 19, 2015

(30) Foreign Application Priority Data

Mar. 20, 2012 (FR) ..................... 12 00841

(51) Int. Cl.
*G02C 7/02* (2006.01)
*G02C 7/10* (2006.01)

(52) U.S. Cl.
CPC ............... *G02C 7/028* (2013.01); *G02C 7/02* (2013.01); *G02C 7/027* (2013.01); *G02C 7/10* (2013.01)

(58) Field of Classification Search
CPC ............ G02C 7/02; G02C 7/061; G02C 7/06; G02C 2202/22; G02C 7/028; G02C 7/027; G02C 7/10; G02C 7/024; G02B 1/041
(Continued)

(56) References Cited

U.S. PATENT DOCUMENTS

| 2005/0073650 A1* | 4/2005 | Ito .................... G02C 7/021 351/200 |
| 2008/0052194 A1 | 2/2008 | Shinohara et al. |
| 2010/0157242 A1 | 6/2010 | Esser et al. |

FOREIGN PATENT DOCUMENTS

| EP | 1 515 179 A1 | 3/2005 |
| WO | 00/16683 A1 | 3/2000 |

OTHER PUBLICATIONS

Esser G et al.: "Die Performance Individueller Gleitsichtglaeser", Deutsche Optiker Zeitung, XX, DE, Dec. 1, 2005 (Dec. 1, 2005), pp. 38-44, XP000962762, p. 40; figure 8 p. 43, col. 2—p. 44, col. 1.
(Continued)

*Primary Examiner* — Bumsuk Won
*Assistant Examiner* — Henry Duong
(74) *Attorney, Agent, or Firm* — Young & Thompson

(57) ABSTRACT

A method for manufacturing a corrective ophthalmic glasses lens personalized for a wearer, includes defining and digitally recording the configuration parameters of the lens, calculating modeling data of the refractive faces of the lens, and manufacturing the lens in accordance with the configuration parameters. The method includes the following steps: recording at least one ordered execution sequence of different interactive configuration software modules, each module being associated with one of the configuration parameters and including, in a graphical interface, selecting at least one configuration parameter value associated with the module from a preselection of values of the parameter, graphically simulating a virtual lens obtained with the selected value of
(Continued)

the configuration parameter, confirming the selection of a configuration parameter value, executing the at least one ordered sequence; at the end of the execution of each module, recording the selected, confirmed value of the configuration parameter associated with the module.

15 Claims, 5 Drawing Sheets

(58) Field of Classification Search
USPC .................................................. 351/159.75
See application file for complete search history.

(56) References Cited

OTHER PUBLICATIONS

International Search Report, dated Jun. 17, 2013, from corresponding PCT application.

* cited by examiner

METHOD FOR MANUFACTURING A CORRECTIVE OPHTHALMIC GLASSES LENS PERSONALISED FOR A WEARER

TECHNICAL FIELD OF THE INVENTION

The present invention relates generally to the field of the manufacture of corrective ophthalmic spectacle lenses. More precisely, the invention relates to a procedure making it possible to personalize a corrective lens by selecting a set of configuration parameters such as the material, the optical power function, the color, the surface treatment(s), the chromaticity, while taking into account especially the vision behavior of the spectacle wearer, that is to say of the envisaged use of the spectacles for car driving and/or at the office.

It relates more particularly to a procedure making it possible to graphically display a plurality of configuration parameters for an ophthalmic correction lens and to progressively select the various configuration parameters, while taking account especially of the optical design parameters and morphological parameters of the wearer, so as to rapidly determine an optimal personalized correction lens.

It relates in particular to a configuration procedure for the manufacture of correction lenses of uni-, bi- or tri-focal type, of varifocal lenses or of progressive lenses.

PRIOR ART

The personalization of corrective ophthalmic lenses relies on the selecting by the future wearer of spectacles of a certain number of options from among a set of configuration parameters proposed for example by a consultant optician.

However, the choice of certain configuration parameters, for example the material of the lens, combined with the lens design parameters, may be incompatible with other parameters such as the frame selected. It is essential to be able to offer a wearer a personalized lens achievable as a function of the prescription and of the set of configuration parameters selected. Moreover, it is desirable that the selection of the set of configuration parameters be performed in the shortest possible time span.

SUMMARY OF THE INVENTION

In order to remedy the aforementioned drawback of the prior art, there is proposed, according to the present invention, a method for manufacturing a corrective ophthalmic spectacle lens personalized for a wearer, comprising the steps of:
defining and recording, by computer, configuration parameters of the lens, these configuration parameters comprising optical design parameters of the lens, including a refraction correction prescription for the wearer and an optical design model,
manufacturing the lens in accordance with the configuration parameters.

To define the configuration parameters of the lens, the method comprises the following steps:
recording at least one ordered sequence of execution of various interactive configuration software modules, each module being associated with one of the configuration parameters and comprising, in a graphical interface, means of selection of at least one configuration parameter value associated with the module from among a preselection of values of this parameter, means of graphical simulation of a virtual lens obtained with the selected value of the configuration parameter, means of validation of the selection of a value of the configuration parameter,
executing said at least one ordered sequence;
on completion of the execution of each module of said at least one ordered sequence, recording the selected and validated value of the configuration parameter associated with this module.

Advantageously, the method comprises, on completion of the execution of a module of said ordered sequence, a step of using the configuration parameter value selected and validated at the end of the execution of said module, so as to determine a preselection of values of the configuration parameter for a subsequent module of said sequence.

Advantageously again, there is moreover envisaged the recording of a plurality of ordered sequences of execution of the modules and the selection, from among the latter, of a sequence according to which the modules are executed.

Typically, the configuration parameters of the lens comprise manufacturing parameters of the lens, including the distribution of the optical power function, the material of the lens, the color of the lens, the polarization of the lens, the surface treatment(s) including anti-reflection treatment, impact resistance treatment, anti-scratch treatment, antistatic treatment, water-repelling treatment, grease-repelling treatment, polarizing treatment, the photochromy property of the lens, and/or geometric and morphological parameters relating to the wearer and to a spectacle frame.

In a first particular embodiment of the method for manufacturing a corrective ophthalmic lens, the execution of at least one of the modules comprises the following steps:
selection of at least one image representative of a visual setting and display of said image as background layer of an area of the graphical interface of the module concerned;
simulation of a corrective filter associated with the selected value of the configuration parameter of the lens;
display of the corrective filter superimposed by transparency on the background layer, so as to simulate the vision of the wearer through a virtual lens personalized in accordance with the selected value of the configuration parameter associated with the module.

In a variant of the first embodiment, the method for manufacturing a corrective ophthalmic lens furthermore comprises the following steps:
selection of a second image representative of a visual setting and display of said second image as background layer of a second area of the graphical interface of the module concerned;
simulation of a second corrective filter associated with another value of the configuration parameter of the lens;
display of the second corrective filter superimposed by transparency on said second image as background layer of the second graphical area so as to simulate the vision of the wearer through a second virtual lens personalized in accordance with the other value of the configuration parameter, so as to allow the comparison of at least two personalized virtual lenses.

In a second particular embodiment of the method for manufacturing a corrective ophthalmic lens, the execution of at least one of the modules comprises the following steps:
selection of at least one view of the wearer and display of said view of the wearer as background layer of an area of the graphical interface of the module concerned;

simulation of a filter of shape and of aspect of the lens as a function of the selected value of the configuration parameter associated with the module;

display of the filter of shape and of aspect of the lens superimposed by transparency on the background layer so as to simulate an image of the lens worn by the wearer and personalized in accordance with the selected value of the configuration parameter associated with the module.

In a first variant of the first or of the second embodiment, the step of selecting at least one image and/or at least one view of the wearer comprises the selecting of a sequence of images or of an image in three dimensions.

In another variant of the first or of the second embodiment, the step of simulating a filter comprises the dynamic simulation of a filter by a sequence of images or by an image in three dimensions.

Advantageously, the method furthermore comprises the display of a textual content as a function of the selected value of the configuration parameter associated with the module.

In a preferred manner, the method for manufacturing a corrective ophthalmic lens furthermore comprises a step of selecting a spectacle frame.

Advantageously, the manufacture method comprises a module for choosing lens contour in the guise of configuration parameter, this module comprising, in its graphical interface, means for selecting at least one lens contour from among a preselection of lens contours associated with various spectacle frames, means of graphical simulation of a virtual lens exhibiting the selected contour and means for validating the selection of a lens contour.

Preferably, the method for manufacturing a corrective ophthalmic lens furthermore comprises a step of presenting the values of the various configuration parameters selected and validated on completion of the execution of said at least one ordered sequence.

In an advantageous manner, the method for manufacturing a corrective ophthalmic lens furthermore comprises a step of verifying the feasibility of a corrective ophthalmic lens in accordance with the values of the various configuration parameters selected and validated on completion of the execution of said at least one ordered sequence.

Preferably, the method for manufacturing a corrective ophthalmic lens furthermore comprises a step of constructing at least one preselection of values, associated with a configuration parameter.

BRIEF DESCRIPTION OF THE DRAWING FIGURES

The following description and the appended drawings to which it refers, which are given by way of nonlimiting example, will allow what the invention consists of and how it can be carried out to be understood.

DETAILED DESCRIPTION OF THE INVENTION

Figure 1:
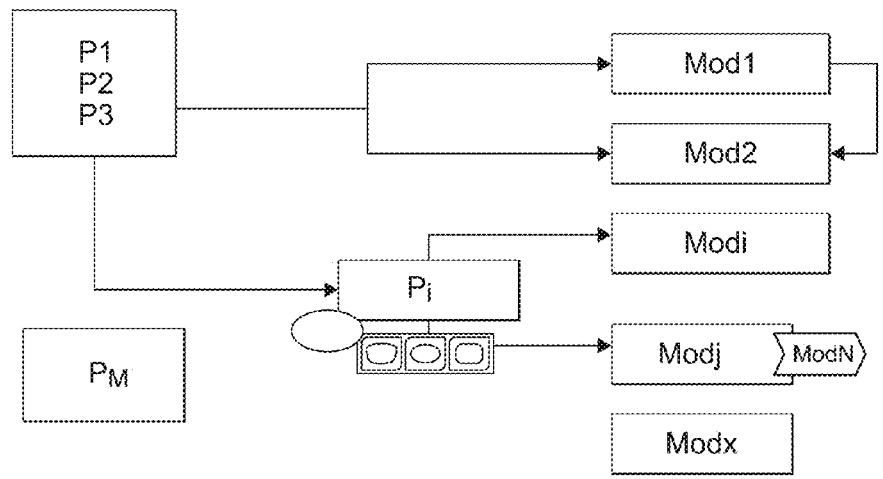
FIG. 1 is a block diagram representing the various steps of the procedure of the invention.

FIG. 1 is a block diagram representing various steps of a procedure for determining the configuration parameters of a corrective lens or of a pair of corrective lenses.

The configuration parameters are very numerous. In the present document P1, P2, P3 . . . Pi or . . . PM designates a particular configuration parameter, such as: the material of the lens, the design of the optical power function, the color of the lens, an anti-reflection treatment. Each of these configuration parameters may take a value from among a set of predefined values. The values of some of these parameters may be known in advance (the prescription generally defines the power correction values for far vision and for near vision) and may be recorded by computer for example. A certain number of other values of configuration parameters must be selected by the optician and/or the future wearer.

Once the optician and/or the future wearer have selected a set of values of configuration parameters of the lens and it is verified that the corresponding lens is indeed achievable, its manufacture can start.

This manufacture is then carried out according to the customary manufacturing steps, known to the person skilled in the art. In particular, the visual correction prescription, the material chosen for the lens, the optical design parameters of the lens and geometric parameters of the chosen frame (especially its contour) are used to calculate data for modeling the refraction faces of the lens and its contour, which data are transmitted to the manufacturing devices to obtain the desired lens.

FIG. 1 represents the general architecture of the software implementing the procedure of the invention. Configuration parameters P1, P2, P3 . . . Pi . . . PN are recorded by computer. Mod1, Mod2, Mod3 . . . Modi . . . ModN designate various interactive configuration software modules. Each module Modi is generally associated with one of the configuration parameters Pi. Nonetheless, a module Modi may be associated with several configuration parameters Pi. For example, the module Mod1 may be associated with several configuration parameters P1, P2, P3.

These modules are integrated into a software application comprising data stored in a database and files, a graphical interface and scripts. This application is executed on a computer, a digital touch-sensitive tablet, a smartphone, etc.

The aim of executing a configuration module Modi is to lead to the selection of a value for the configuration parameter Pi associated with this module. Advantageously, the execution of a configuration module Modi comprises a graphical presentation of a simulation as a function of the selected parameter or parameters. On completion of the execution of a software module Modi, a value of the parameter Pi is validated and recorded by computer. The various modules may be executed in a mutually independent manner (example module Modx in FIG. 1) or else in series (e.g. Mod1 and Mod2 in FIG. 1). We pass sequentially from module Mod1, to module Mod2 . . . Modi . . . Modj. When the parameters associated with the various useful modules have been validated and recorded, a module ModN makes it possible to verify the feasibility of the overall configuration of the lens. If the feasibility of the lens is confirmed, it is possible to pass to the step of selling the lens and to launch its manufacture.

Advantageously, the software application possesses means for defining a sequence of execution of the various modules so as to rapidly lead to a lens configuration which is both technically achievable and tailored to the needs of the wearer.

Figure 2:
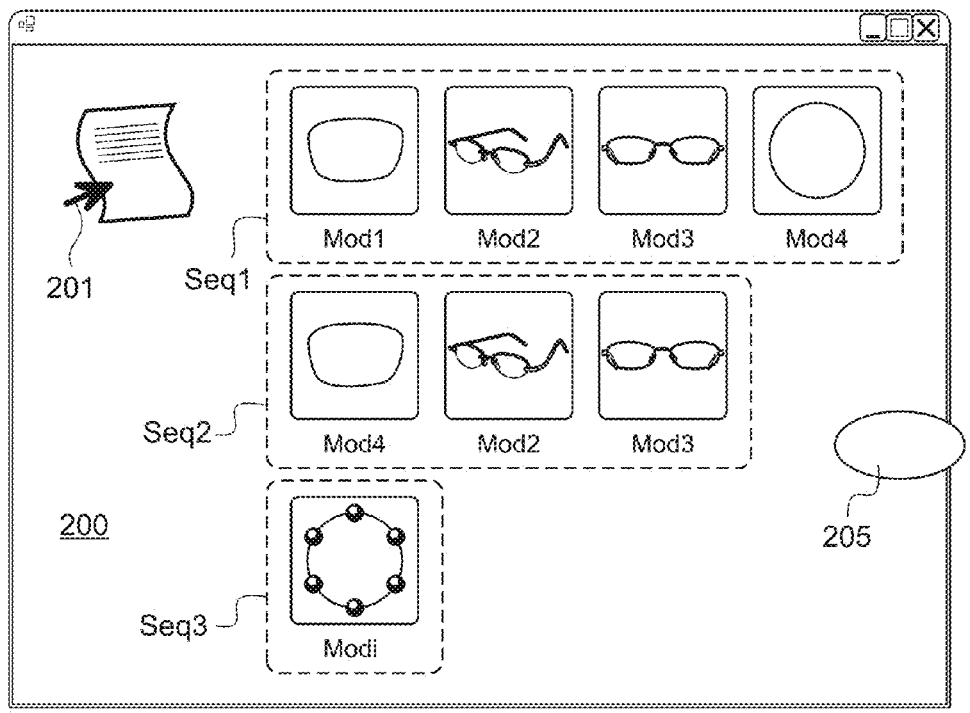
FIG. 2 is a view of a graphical interface of a general module for presenting and selecting a set of configuration parameters according to a particular embodiment.

FIG. 2 is a view of a graphical interface 200 of a general module for presenting and selecting a set of configuration parameters according to a particular embodiment. The graphical interface 200 is displayed for example on a mobile telephone touchscreen or on a digital tablet. A file, represented on the graphical interface by an icon 201, records the values of the configuration parameters relating to a corrective lens for a wearer. In an advantageous manner, the file corresponding to the icon 201 also contains geometric and morphological parameters relating to the wearer and to a spectacle frame. Various interactive configuration software modules Mod1, Mod2, Mod3 . . . Modj are represented by shortcuts on the graphical interface 200. The interface 200 makes it possible to select an ordered sequence of modules by a drag and drop action. On the interface 200, several sequences Seq1, Seq2, Seq3 are predefined. The sequence Seq1 begins with the execution of the module Mod1, then of the module Mod2, of the module Mod3 and terminates with the module Mod4. The sequence Seq2 begins with the execution of the module Mod4, then of the module Mod2 and terminates with the module Mod3. The sequence Seq3 comprises a single module Modi.

By way of illustrative and nonlimiting example, the module Mod1 may correspond to a configuration module for the optical design, that is to say the distribution of the optical power, of a lens with progressive focal length. The module Mod2 may correspond to a configuration module for an anti-reflection treatment. The module Mod3 may correspond to a configuration module for a tint and/or the photochromy of the lens. The module Mod4 may correspond to a configuration module for the polarization of the lens. Finally, the module Modi may correspond to a configuration module for the thickness and the weight of the lens.

Choosing the sequence makes it possible to select the parameters which will be configured. Choosing a sequence also imposes the order in which the modules will be executed. On completion of each module, a configuration parameter is determined by recording a validated value of the parameter concerned. The graphical button 205 makes it possible to start the application, that is to say the execution of a selected sequence.

Figure 3:
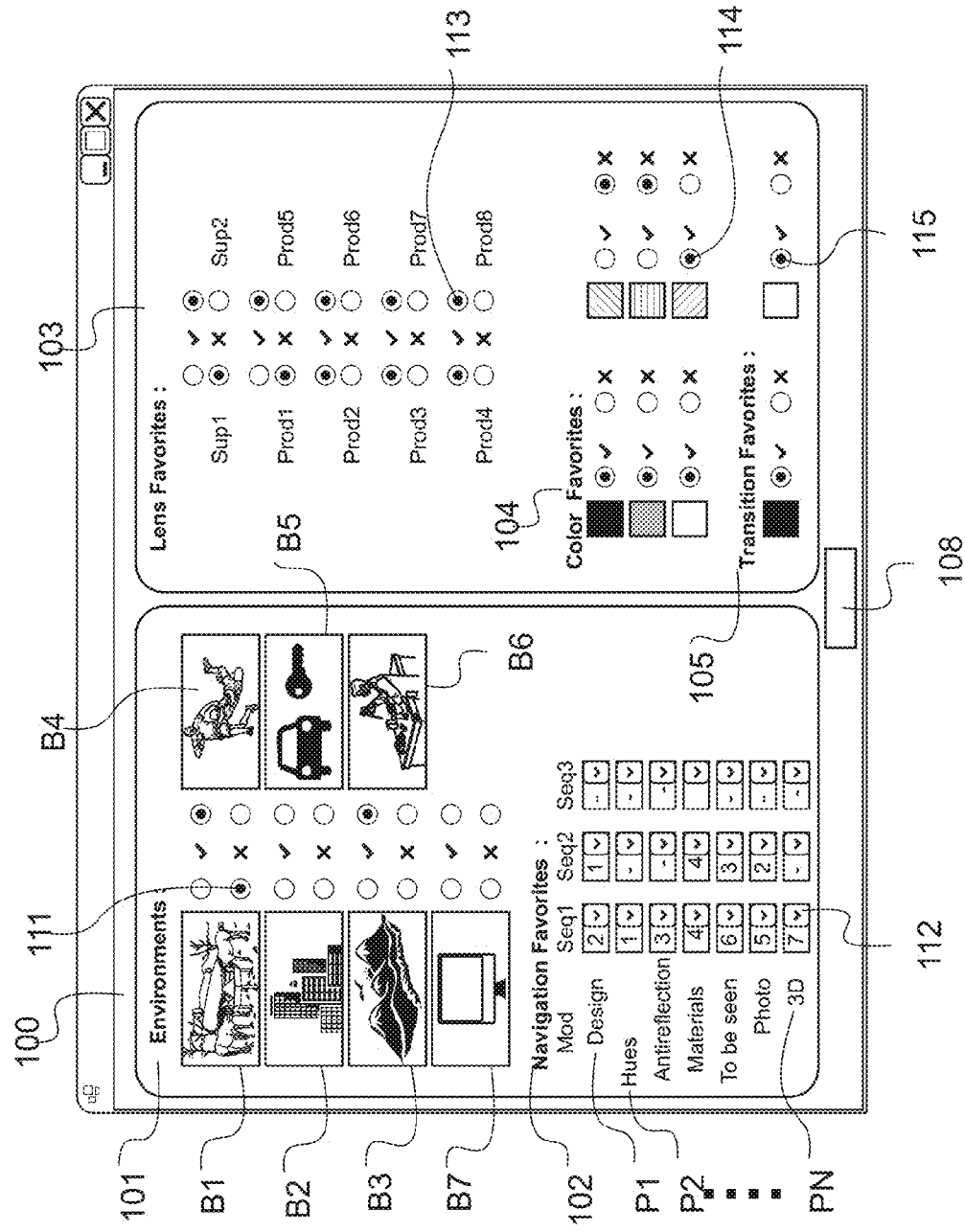
FIG. 3 is a view of a graphical interface of a general module for presenting and selecting a set of configuration parameters according to another particular embodiment.

FIG. 3 is a view of another type of graphical interface 100 of an application for presenting and preselecting a set of configuration parameters. The graphical interface 100 is displayed for example on a computer screen. The graphical interface 100 is for example the optician's configuration interface, this interface 100 not necessarily being presented or accessible to a spectacle-wearing client. The graphical interface 100 comprises several preselection areas. A first preselection area 101 comprises icons B1, B2, . . . B7 each corresponding to a static environment image B1, . . . B6 or dynamic environment image B7 and means 111 to select or to deselect each image. The selection means 111 may take various known forms, for example pop-up menu or area selectable by pressing the computer mouse button. The dynamic image B7 may for example correspond to a film or to a view in three dimensions. The images B1, B2 . . . B7 may originate from photo or video images or else from simulation images. Each environment image B1, B2, . . . B7 corresponds to a visual setting of use and is intended to simulate the setting of use as is detailed further on. The optician can thus limit the selection of the environment images which will be proposed for example to the images B4 and B6 from among the predefined environment images B1, B2, . . . B7.

A second preselection area 102 of the graphical interface 100 of FIG. 3 comprises a lookup table for the correspondence between a list of sequences Seq1, Seq2, Seq3 of execution of the software modules and a list of configuration parameters P1, P2, . . . PN. "Sequence" is intended to mean an ordered list of configuration software modules. Each configuration parameter P1, P2, . . . PN is associated with a software module respectively Mod1, Mod2, . . . ModN. For example, the configuration parameters P1, P2, . . . PN correspond respectively to a parametrization:

of the optical design concept, that is to say the optical power function of the lens (P1),
of the color of the lens (P2),
of an anti-reflection treatment (P3),
of the material of the lens (P4),
of a view representative of a subject equipped with the lenses and/or with the frame (P5),
of a snapshot of the wearer (P6),
of a three-dimensional view (PN).

In the area 102, the optician can define several sequences Seq1, Seq2, Seq3 of execution of the various modules. At the intersection of a row corresponding to a configuration parameter and of a column corresponding to a sequence, a pop-up menu 112 makes it possible to select the parameter in the corresponding sequence and to define its execution serial number in the sequence. It is thus possible to define various sequences, while selecting for each sequence the parameters that it is desired to configure and the order of execution of the corresponding modules. For example the sequence Seq1 is defined by the column of parameters in the following order of execution: P2, P1, P3, P4, P6, P5, PN. The sequence Seq2 is defined by the column of parameters in the following order of execution: P1, P6, P5, P4. The sequence Seq3 is not defined.

A third preselection area 103 of the graphical interface 100 of FIG. 3 comprises two preselection lists presented side by side. It is for example possible to preselect a lens supplier Sup1 and/or Sup2. Only the products of the supplier or suppliers thus preselected will thereafter be proposed and used during the execution of the configuration modules. For each supplier, it is possible to select one or more products from among a list of preselected products Prod1, Prod2, Prod3, Prod4 corresponding to the supplier Sup1 and respectively Prod5, Prod6, Prod7, Prod8 corresponding to the supplier Sup2. This preselection area thus makes it possible to select, by computer, products from one or more supplier catalogs. The optician can thus select products that he desires to sell by priority during a certain time period.

A fourth preselection area 104 of the graphical interface 100 of FIG. 3 comprises preselection means 114 for preselecting one or more colors of the lens. Another preselection area 105 of the graphical interface 100 of FIG. 3 comprises preselection means 115 for preselecting one or more color transitions of the lens.

A button 108 makes it possible, by a mouse click, to validate the preselections of the various areas of the graphical interface 100. The person skilled in the art will readily understand that the graphical interface 100 makes it possible to define a set of so-called favorite parameters, in particular the definition of the sequences, which are used thereafter for the execution of a configuration modules execution sequence. Other preselections corresponding to other parameters and/or other suitable preselection means are of course conceivable.

Let us assume that a particular sequence has been chosen. The validation of the sequence starts the sequential execution of one or more configuration modules.

The interface of FIG. 3 represents an exemplary sales interface configurable as a function of profiles predetermined according to the following criteria:

a) Products 103:
  a first criterion corresponds to the client segment and determines a list of products Sup1, Sup2 (defined by their optical design, the materials, the surface treatments, etc.) accessible to a particular affiliate, a chain of shops and/or a category of clients;
  a second criterion Prodi corresponds to the optician's favorite products (generic or particular progressive lenses, coloration, etc.). The second criterion makes it possible to refine the selection effected by the first criterion.

b) Environment 101:
  The environment indicates the profile of use of the spectacles (sea, mountain, indoor, outdoor, etc.). The environment can select a suitable background image as a function of the situation (background on which the simulation test is done is produced during the execution of a configuration module).

c) Navigation Favorites 102:
  The navigation favorites 102 serve to define an ordered sequence of various configuration modules to be executed one after the other.

d) Frames:
  The interface can propose a choice of various frames to try on a range of lines (as a function of size, brand, shape, price, etc.).

e) Promotions by periods.

In an advantageous manner, the devising of predetermined lists is performed upstream, by the characterization of the combinations that are possible technically or from the commercial standpoint.

Figure 4:
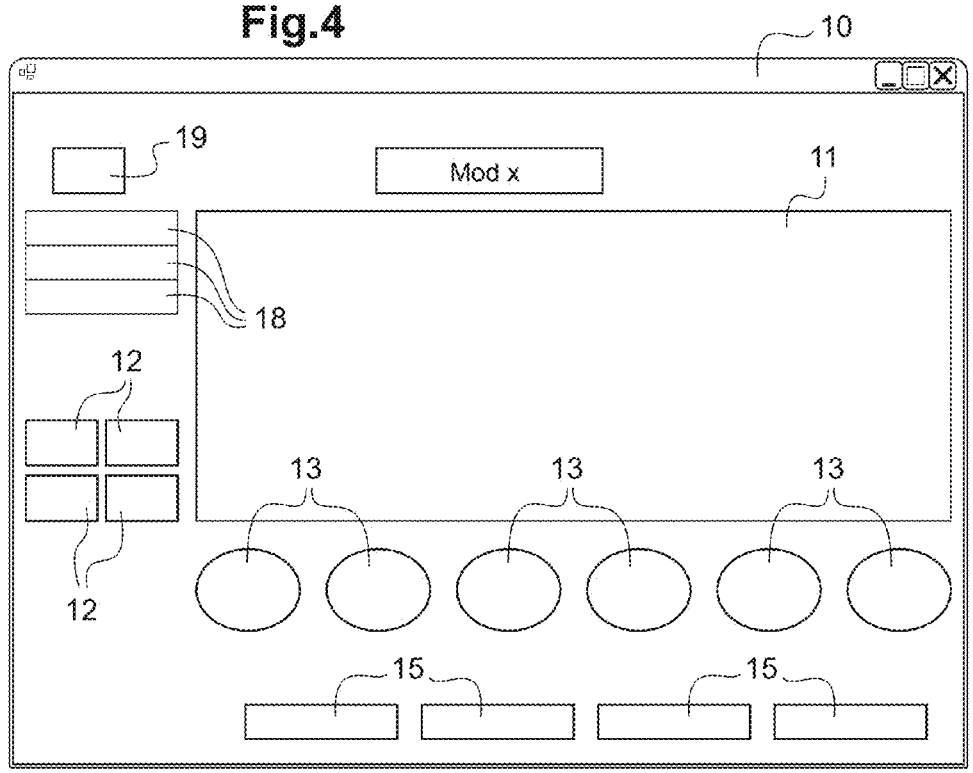
FIG. 4 is a view of a graphical interface of a configuration module according to a particular embodiment.

FIG. 4 schematically represents an exemplary graphical interface 10 of a configuration module Modx according to a particular embodiment. The graphical interface 10 comprises a graphical presentation area 11, areas for displaying a textual content 15, 19 and various selection buttons 12, 13 and 18. By way of example, the display area 19 makes it possible for example to display the name of the client. Each button 12 corresponds to a different value of a configuration parameter Px associated with the module Modx. For example, the parameter Px can correspond to the color of a lens, to be chosen for example from among white, black, brown or gray lens. The selection of a button 12 makes it possible to select a value prerecorded elsewhere of the configuration parameter Px. The graphical presentation area 11 may for example display in the background an image corresponding to an environment or a scene selected elsewhere. The graphical area 11 makes it possible to display in the foreground a colored filter corresponding to the selected value of the parameter Px superimposed on the environment image. The user can thus view the image of a scene through a lens of such and such a color. The selection of another button 12 selects another value of the color parameter and brings about the display of a corresponding colored filter. Each button 13 corresponds to a different action. For example, the buttons 13 can make it possible to select various environment images. The selection of a button 13 brings about the modification of the environment image displayed. A button 13 can also make it possible to execute an action, for example to horizontally and/or vertically modify the direction of the gaze in a three-dimensional view. The user can thus view the effect of the color of the lens in various visual settings such as: outdoors, indoors, on a light or dark background, in far vision, in near vision, etc. The areas for displaying a textual content 15 make it possible to display a short text in conjunction with the parameter or parameters selected. The prerecorded textual content displayed at 15 makes it possible to provide complementary information such as a piece of advice. The buttons 18 are buttons for passing to the graphical interface of a previous module or of a next module in the sequence. The selection of a button 18 makes it possible to validate the selection of a value of the parameter Px. Preferably, the execution of the subsequent configuration module starts automatically as soon as the parameter Px of the module Modx is validated.

Figure 5:
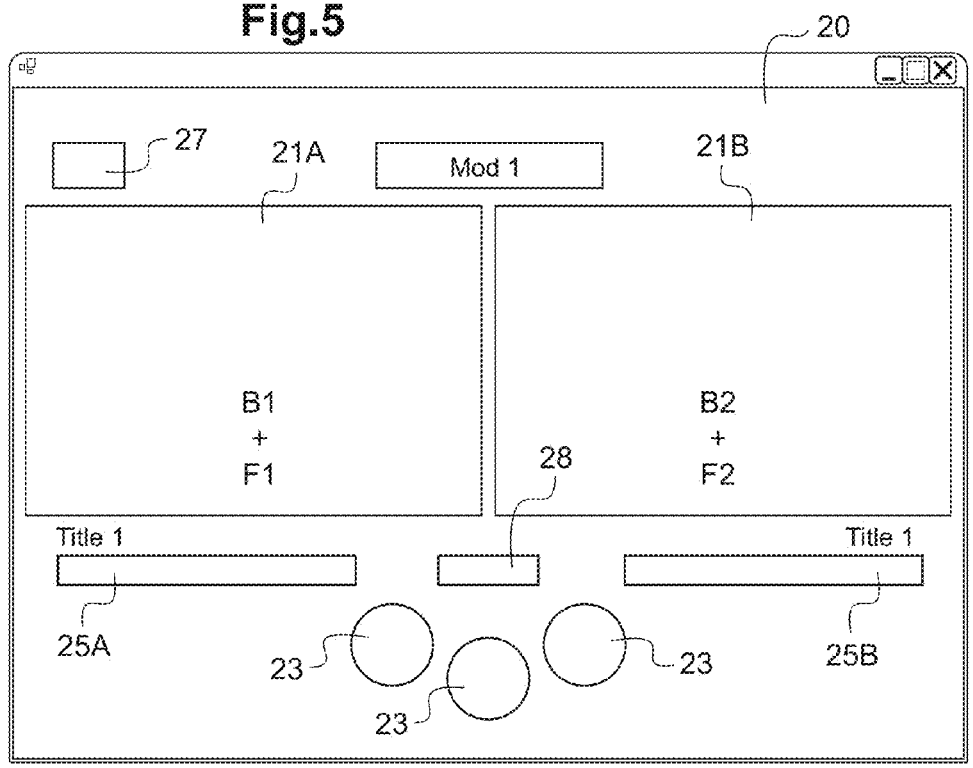
FIG. 5 is a block diagram representing the various areas of a graphical interface of a configuration module.

FIG. 5 is a block diagram representing another exemplary graphical interface of a configuration module Mod1. The graphical interface 20 comprises two graphical presentation areas 21A and 21B, various selection buttons 23, 27, 28 and areas for displaying textual contents 25A and 25B. The two graphical presentation areas 21A and 21B allow a graphical comparison between two different configurations. Advantageously, each graphical presentation area 21A, 21B makes it possible to display a graphical assemblage comprising a background image and an overlay filter superimposed on the background image. For example, the area 21A displays a graphical assemblage comprising a background image B1 and an overlay filter F1, while the area 21B displays another graphical assemblage comprising a background image B2 and an overlay filter F2. By way of example, the image B1 can correspond to a video recording or a simulation of a scene in three dimensions. The filter F1 can represent a graphical simulation of a first optical power parametrization of a progressive lens. The image B2 can correspond to a video recording or a simulation of another scene in three dimensions. The filter F2 can represent a graphical simulation of a second optical power parametrization of another progressive lens. The area 21A graphically presents the vision from the point of view of the wearer equipped with a first lens in the setting of the image B1 and the area 21B presents the vision from the point of view of the wearer equipped with a second lens in the setting of the image B2. The interface 20 thus makes it possible to graphically compare various configurations of corrective lenses.

Moreover, the buttons 23 make it possible, inside the module Mod1, to launch dynamic simulations. Each button 23 corresponds to a particular dynamic simulation. For example, a button 23 makes it possible to launch a dynamic simulation in the presentation area 21A by traversing the three-dimensional image B1 so as to simulate a modification of the direction of the wearer's gaze. Another button 23 makes it possible to launch another dynamic simulation in the presentation area 21B by traversing the three-dimensional image B2 so as to simulate a modification of the inclination of the wearer's head. A third button 23 makes it possible to simultaneously launch the dynamic simulation of change of gaze in the presentation area 21A and the dynamic simulation of inclination of the head in the presentation area 21B. Advantageously, the buttons 23 are of single-click on/off type. The area for displaying textual content 25A, respectively 25B, displays a short text in conjunction with the dynamic simulation represented in the area 21A, respectively 21B. The button 28 makes it possible to compare the vision with one and the same synchronization for the configurations of two different lenses. The button 27 makes it possible to return to the main menu or to string on the execution of the subsequent module.

Figure 6:
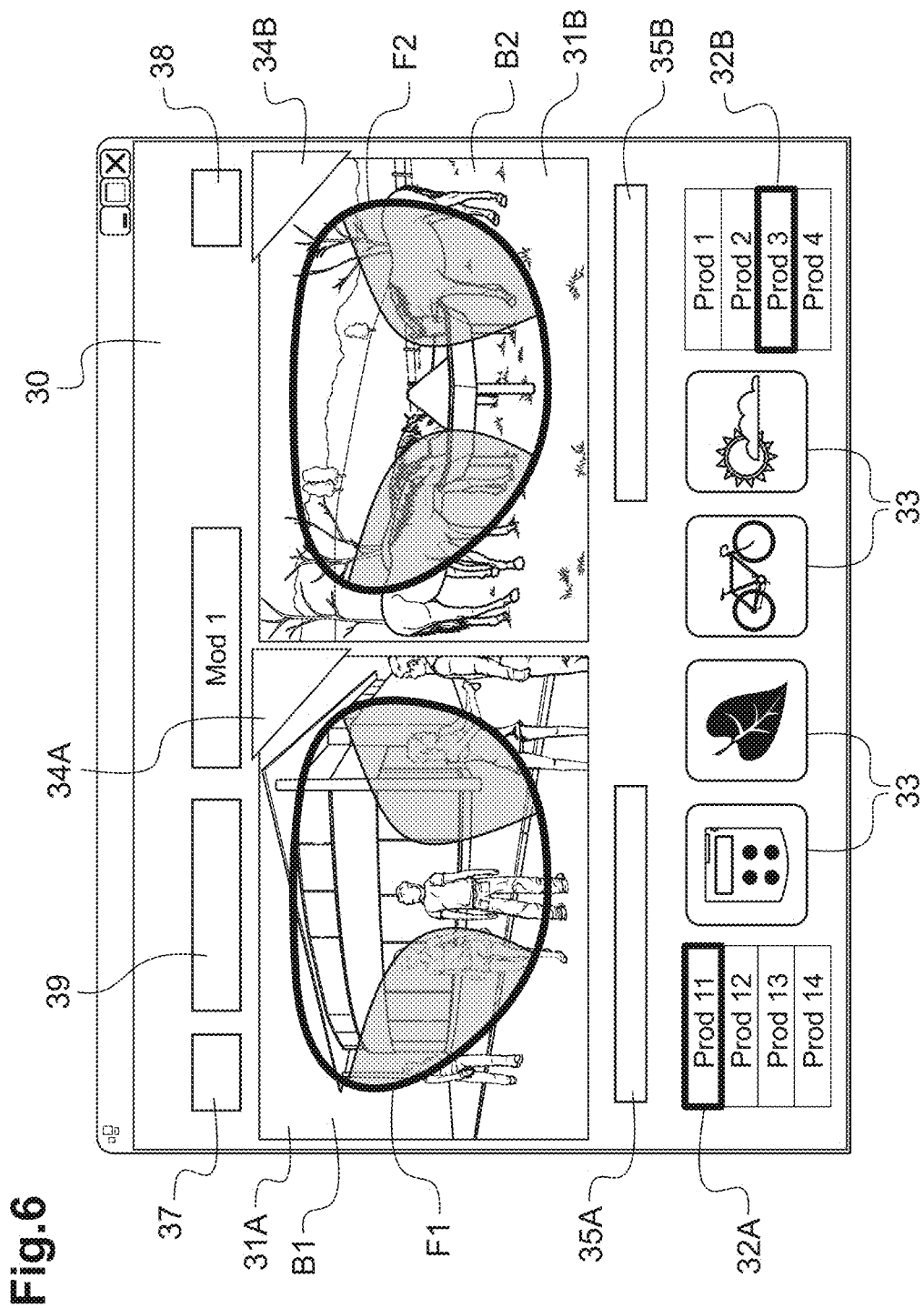
FIG. 6 is a first exemplary graphical interface of a configuration module for the selection of a type of lens in vision mode.

FIG. 6 illustrates a first exemplary graphical interface of a configuration module Mod1 for selecting a type of lens in vision mode, also called "To see" mode. The graphical interface 30 comprises two graphical presentation areas 31A and 31B, various selection buttons 32, 33, 37, 38 and areas for displaying textual contents 35A, 35B and 39 and validation areas 34A, 34B. The area 39 makes it possible for example to display the name of the wearer for whom it is desired to perform the configuration. The two graphical presentation areas 31A and 31B allow a graphical comparison between two different configurations. As explained in conjunction with FIG. 5, each graphical presentation area 31A, 31B makes it possible to display a graphical assemblage comprising a background image and an overlay filter superimposed on the background image. Thus, the area 31A displays a graphical assemblage comprising a background image B1 and an overlay filter F1, while the area 31B displays another graphical assemblage comprising a background image B2 and an overlay filter F2. The image B1, respectively B2, is a static, dynamic image, a video recording or else a simulation of a scene in three dimensions. In the example of FIG. 6, the filter F1 represents the graphical simulation of a progressive lens according to a first optical power parametrization or else optical design. The filter F2 represents a graphical simulation of another progressive lens according to a second optical power parametrization. The selection area 32A makes it possible to select a product Prod1 from among a list of various products Prod1, Prod2, Prod3, Prod4. Each product corresponds to a progressive lens having a specific optical power parametrization, which calls an associated filter F1. The area 21A graphically presents the vision from the point of view of the wearer equipped with a first lens in the setting of the image B1 having regard to the filter F1 selected, that is to say the product Prod1 selected. In an analogous manner, the area 21B presents the vision from the point of view of the wearer equipped with a second lens in the setting of the image B2 having regard to the filter F2 selected, that is to say the product Prod3 selected. The area for displaying textual content 35A, respectively 35B, displays a short text in conjunction with the selection of the product represented in the area 31A, respectively 31B. The interface 30 thus makes it possible to graphically compare various configurations of progressive lenses.

The validation area 34A, respectively 34B, makes it possible to select the configuration corresponding to the parametrization represented in the graphical area 31A, respectively 31B. Moreover, the buttons 33 make it possible, inside the module Mod1, to launch complementary actions in dynamic conjunction with the selection in progress. Each button 33 corresponds to a particular action such as: the calculation of the price of the lens, the dynamic display of a moving background image simulation, the dynamic display simulating a variation in brightness, etc. Advantageously, the buttons 33 are of single-click on/off type. The button 37 makes it possible to return a previous screen. The button 38 makes it possible to pass to a next screen or to string on the execution of the subsequent module.

Figure 7:
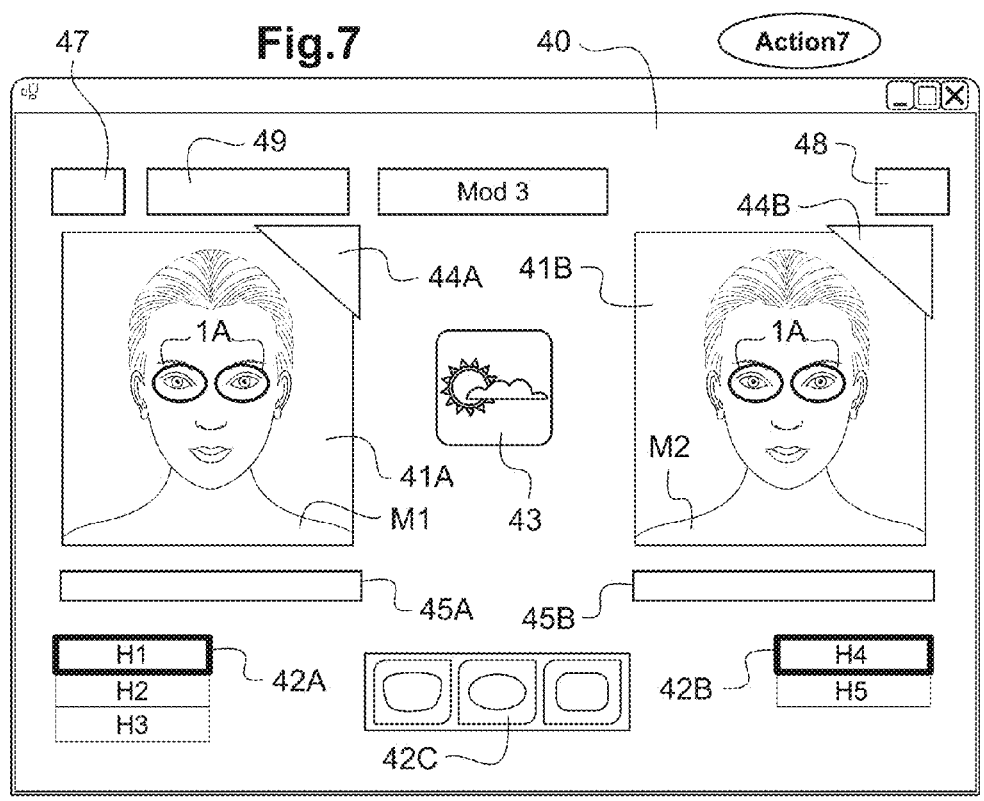
FIG. 7 is an exemplary graphical interface of another configuration module for the selection of the tint and/or photochromy of a lens.

FIG. 7 illustrates an exemplary graphical interface of another configuration module for selecting the tint and/or photochromy of a lens. The configuration module Mod3 makes it possible to view a representation of the wearer furnished with the lenses and/or the frame, also called "To be seen" mode. The graphical interface 40 comprises two graphical presentation areas 41A and 41B, various selection buttons 42A, 42B, 42C, 47, 48, areas for displaying textual contents 45A, 45B and 49 and validation areas 44A, 44B. The area 49 makes it possible for example to display the name of the wearer for whom the configuration is performed. The two graphical presentation areas 41A and 41B allow a visual comparison between two different configurations. As explained in conjunction with FIGS. 5 and 6, each graphical presentation area 41A, 41B makes it possible to display a graphical assemblage comprising a background image and an overlay filter superimposed on the background image. Thus, the area 41A displays a graphical assemblage comprising a background image M1 and an overlay filter 1A while the area 41B displays another graphical assemblage comprising a background image M1 and an overlay filter 1B. In the present module Mod3, the image M1, respectively M2 is a static, dynamic image, a photo or video recording of the face of the wearer without lens or spectacle frame. Advantageously, the images M1 and M2 are identical so as to allow an objective comparison of the color of the lenses on the wearer. In an advantageous manner, a photo M1 of the wearer can be recorded by a separate module of the sequence in the course of execution or by a specific action inside a module.

In the example of FIG. 7, the filter 1A represents the simulation of a pair of colored lenses. The selection area 42A makes it possible to select, from among a list of various proposed lens colors (H1, H2, H3), the color H1 of the pair of colored lenses which corresponds to the displayed filter 1A in the area 41A. The area 41A graphically presents a front view of the wearer equipped with a first pair of colored lenses in the setting of the image M1 having regard to the filter 1A selected, that is to say the color H1 selected. In an analogous manner, the filter 1B represents a graphical simulation of another pair of colored lenses corresponding to the color H4 selected from the selection area 42B from among another list of colors H4 and H5. In an analogous manner, the area 41B presents a front view of the wearer equipped with a second pair of colored lenses on the image M2 having regard to the filter 1B selected, that is to say the color H4 selected. The area for displaying textual content 45A, respectively 45B, displays a short text in conjunction with the lens color selected and represented in the graphical area 41A, respectively 41B. The interface 40 thus makes it possible to graphically compare various colors of lenses such as they will appear when the lenses are worn by the wearer. The validation area 44A, respectively 44B, makes it possible to validate the configuration corresponding to the parametrization represented in the graphical area 41A, respectively 41B. Moreover, the buttons 42C make it possible, inside the module Mod3, to modify the shape of the lenses. Each icon-button 42C makes it possible by simply clicking on the corresponding simplified icon to select and to apply to the filters 1A and/or 1B a particular shape of lens such as: elliptical, rectangular, rounded, etc. The button 47 makes it possible to return a previous screen. The button 48 makes it possible to pass to a next screen or to string on the execution of the subsequent module. In FIG. 7, no spectacle frame is represented in the graphical areas 41A and 41B. In an alternative manner, provision may be made for the display of a filter corresponding to a standard frame or else, as complementary parameter the choice of a frame and its display in combination with the lenses selected (shape and/or color).

In an analogous or complementary manner, it is also possible to represent the selection of various surface treatments such as antireflection treatment. It is also possible to display various color transition parameters of a lens.

Figure 8:
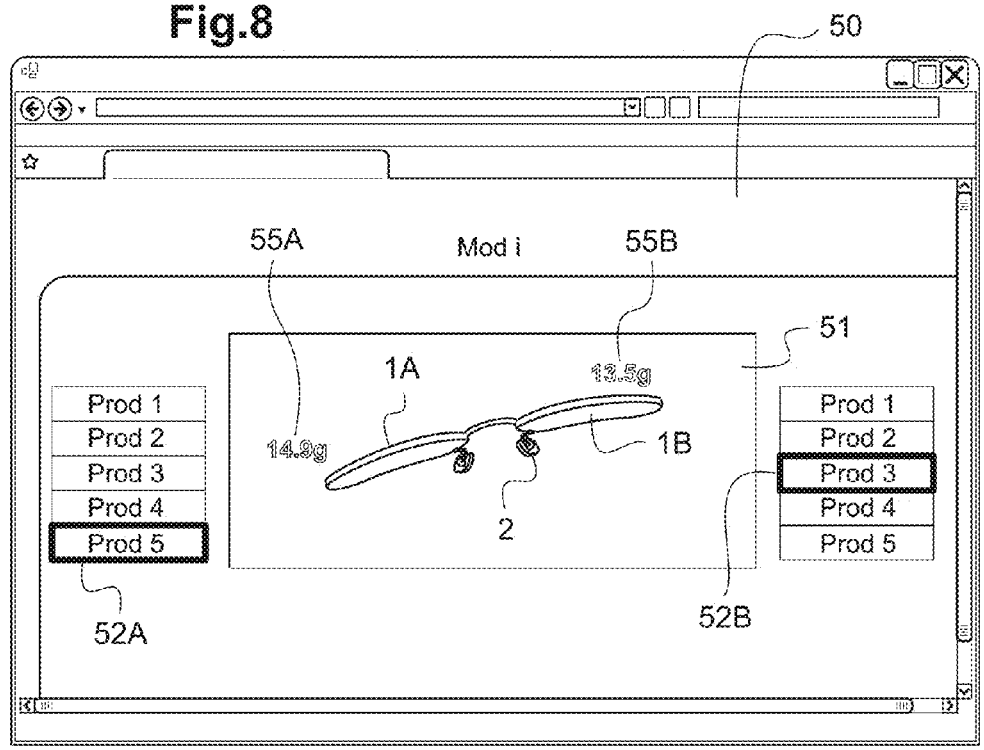
FIG. 8 is an exemplary graphical interface of a configuration module making it possible to graphically view various parameters of the lens (thickness and/or weight) as a function of the type of lens selected.

FIG. 8 illustrates another exemplary graphical interface 50 of a configuration module Modi making it possible to graphically view various parameters of the lens (thickness and/or weight) as a function of the type of lens selected. The configuration module Modi makes it possible to represent a view, for example a profile view, of a simulation of the lenses and of the frame. The graphical interface 50 comprises a graphical presentation area 51, various highlighting-based selection areas 52A, 52B and areas for displaying textual contents 55A and 55B.

The graphical presentation area 51 makes it possible to represent a spectacle frame 2, equipped with a lens for the left eye and with another lens for the right eye. More precisely, the graphical presentation area 51 makes it possible to display a graphical assemblage comprising a background image (neutral background in the example illustrated in FIG. 8), a first overlay filter corresponding to the right lens, a second overlay filter corresponding to the left lens and preferably a third overlay filter corresponding to a frame. The overlay filters are displayed superimposed on the background image. The third overlay filter can correspond to a graphical representation of a standard frame, to a graphical representation of a preselected frame, or else to a photograph of such a frame. The selection area 52A makes it possible to select a particular lens for the left eye from among a first list of various proposed products (Prod1, Prod2, Prod3, Prod4, Prod5). In an analogous manner, the selection area 52B makes it possible to select a particular lens for the right eye from among a second list of various proposed products (Prod1, Prod2, Prod3, Prod4, Prod5) which may be identical or different from the first list. For example, the products Prod1, Prod2, Prod3, Prod4, Prod5 may correspond to various lenses proposed in the catalog of a supplier or else to various materials usable to fashion an ophthalmic lens. The area 51 graphically presents a profile view of the frame 2, of a lens for the left eye 1A corresponding to the product Prod5 selected from the selection area 52A highlighted and of a lens for the right eye 1B corresponding to the product Prod3 selected from the selection area 52B highlighted.

The area for displaying textual content 55A, respectively 55B, displays a short text in conjunction with the product selected and represented on the lens for the left eye 1A and respectively on the lens for the right eye 1B. The graphical presentation area 51 makes it possible simultaneously to represent the profile of a lens for the left eye 1A which would be manufactured from a first material corresponding to the selection Prod5 and to represent the profile of a lens for the right eye 1B which would be manufactured from a second material corresponding to the selection Prod3. Advantageously, the area 51 makes it possible to display at 55A alongside the lens for the left eye 1A information about the weight of the lens Prod5 selected and at 55B, alongside the lens for the left eye 1B, information about the weight of the lens Prod3 selected. The interface 50 thus makes it possible to graphically compare geometric aspects of various lenses as a function of the chosen material. In a complementary manner, the module Modi makes it possible to view other views of the lenses 1A, 1B and/or of the frame. Advantageously, the simulation of the profile of the lenses 1A and 1B takes into account the parametrization of the optical correction prescription. The execution of the module Modi for viewing the profile of the spectacle lenses advantageously takes into account the parameters validated during the execution of the previous modules of the same sequence.

The interface of the module Modi of FIG. 8 can be used as follows to choose one profile rather than another:

1) The choice can be steered by the optician or as a function of the client's sensitivity;

2a) the wearer's life choice: environment of use (mountain/others, FV/NV use predominance), indoor/outdoor, activities, age, gender, previous equipment type, variation in setting (passage from dark to light or vice versa), etc.

2b) type of frames sought: size/face form/rimmed/grooved/rimless.

2c) prescription

Modules other than those detailed in conjunction with FIGS. 1 to 8 are of course conceivable.

The execution the chosen sequence of configuration modules enables the future wearer to follow a personalization route, in the course of which the choices made in each module (that is to say the values of the selected and validated parameters) are recorded in a database or a central file. Advantageously, the final results of the sequence are presented in the form of a maximum of three configurations to be chosen. The three configurations are presented as a function of the costs and/or of technical or esthetic arguments. This thus leads to the determination of a technically achievable optimal configuration of lenses for the wearer which takes account of commercial aspects, such as promotions on certain configuration parameters (promotions on colored lenses for example).

In a more general manner, software is proposed in which the optician can configure various sales routes.

The procedure makes it possible:
- to standardize the prepared speeches of the sales forces via the sharing of the common methods;
- to adapt the choices and the methods of sale: sharing of common methods;
- to adapt the choices and the methods of sale of the optician as a function of the client;
- to systematically update the values of the configuration parameters via a platform updated by computer network (Internet or other);
- to upgrade certain contents without influencing the container, thereby limiting the redevelopment of marketing tools (images, videos and montages), adaptations as a function of commercial campaigns.

The invention claimed is:

1. A method for manufacturing a corrective ophthalmic spectacle lens personalized for a wearer, comprising the steps of:

defining and recording, by computer, configuration parameters of the lens, these configuration parameters comprising optical design parameters of the lens, including a refraction correction prescription for the wearer and an optical design model, manufacturing the lens in accordance with the configuration parameters, wherein, to define the configuration parameters of the lens, the method comprises the following steps:

recording a plurality of ordered sequences of execution of various interactive configuration parts of code of a computer program, and selection, from among the plurality of ordered sequences, of one part of code according to which the modules are executed, each part of code being associated with one of the configuration parameters and comprising, in a graphical interface, a pop-up menu or area selectable by pressing the computer mouse-button for selection of at least one configuration parameter value associated with the module from among a preselection of values of this parameter, a graphical interface and scripts configured for graphical simulation of a virtual lens obtained with the selected value of the configuration parameter, a pop-up menu or area selectable by pressing the computer mouse-button for validation of the selection of a value of the configuration parameter, executing said ordered sequence selected at the previous step;

on completion of the execution of each part of code of said ordered sequence selected, recording the selected and validated value of the configuration parameter associated with this module;

selecting of at least one view of the wearer and display of said view of the wearer as background layer of an area of the graphical interface;

simulating by an image of a corrective filter associated with the selected value of the configuration parameter of the lens;

displaying of the image of the corrective filter superimposed by transparency on said view of the wearer as background layer of said area of the graphical interface, so as to simulate the lens as worn by the wearer, said lens being personalized in accordance with the selected value of the configuration parameter associated with said ordered sequence;

executing another ordered sequence;

on completion of the execution of each module of said another ordered sequence selected, recording another selected and validated value of another configuration parameter associated with said another ordered sequence;

displaying of said view of the wearer as a second background layer of a second area of said graphical interface;

simulating by a second image of a second corrective filter associated with the selected value of said another configuration parameter of another lens; and displaying of the second image of the second corrective filter superimposed by transparency on said view of the wearer as background layer of the second area of said graphical interface, so as to simulate said another lens as worn by the wearer, said another lens being personalized in accordance with the selected value of said another configuration parameter, so as to allow the comparison of at least two personalized virtual lenses as appearing when worn by the wearer.

2. The method for manufacturing a corrective ophthalmic lens as claimed in claim 1, comprising, on completion of the execution of the part of code of said ordered sequence, a step of using the configuration parameter value selected and validated at the end of the execution of said part of code, so as to determine a preselection of values of the configuration parameter for a subsequent part of code of said sequence.

3. The method for manufacturing a corrective ophthalmic lens as claimed in claim 1, wherein the configuration parameters of the lens comprise manufacturing parameters of the lens, including the distribution of the optical power function, the material of the lens, the color of the lens, the polarization of the lens, the surface treatment(s) including anti-reflection treatment, impact resistance treatment, anti-scratch treatment, antistatic treatment, water-repelling treatment, grease-repelling treatment, polarizing treatment, the photochromy property of the lens, and/or geometric and morphological parameters relating to the wearer and to a spectacle frame.

4. The method for manufacturing a corrective ophthalmic lens as claimed in claim 1, wherein the execution of at least one of the parts of code comprises the following steps:

selection of at least one image representative of a visual setting and display of said image as background layer of a graphical area of the graphical interface of the part of code concerned;

simulation of a corrective filter associated with the selected value of the configuration parameter of the lens;

display of the corrective filter superimposed by transparency on said image as background layer, so as to simulate the vision of the wearer through a virtual lens personalized in accordance with the selected value of the configuration parameter associated with the part of code.

5. The method for manufacturing a corrective ophthalmic lens as claimed in claim 4, further comprising the following steps:

selecting a second image representative of a visual setting and display of said second image as background layer of a second graphical area of the graphical interface of the part of code concerned;

simulating a second corrective filter associated with another value of the configuration parameter of the lens;

displaying the second corrective filter superimposed by transparency on said second image as background layer of the second graphical area so as to simulate the vision of the wearer through a second virtual lens personalized in accordance with the other value of the configuration parameter, so as to allow the comparison of at least two personalized virtual lenses.

6. The method for manufacturing a corrective ophthalmic lens as claimed in claim 1, wherein the execution of at least one of the modules comprises the following steps:

selecting at least one view of the wearer and display of said view of the wearer as background layer of an area of the graphical interface of the parts of code concerned;

simulating a filter of shape and of aspect of the lens as a function of the selected value of the configuration parameter associated with the part of code;

displaying the filter of shape and of aspect of the lens superimposed by transparency on the background layer so as to simulate an image of the lens worn by the wearer and personalized in accordance with the selected value of the configuration parameter associated with the part of code.

7. The method for manufacturing a corrective ophthalmic lens as claimed in claim 6, wherein the step of selecting at least one view of the wearer comprises the selecting of a sequence of images or of an image in three dimensions.

8. The method for manufacturing a corrective ophthalmic lens as claimed in claim 6, wherein the step of simulating a filter comprises the dynamic simulation of a filter by a sequence of images or by an image in three dimensions.

9. The method for manufacturing a corrective ophthalmic lens as claimed in claim 1, wherein the step of selecting at least one image comprises the selecting of a sequence of images or of an image in three dimensions.

10. The method for manufacturing a corrective ophthalmic lens as claimed in claim 1, wherein the step of simulating a filter comprises the dynamic simulation of a filter by a sequence of images or by an image in three dimensions.

11. The method for manufacturing a corrective ophthalmic lens as claimed in claim 1, further comprising:
the display of a textual content as a function of the selected value of the configuration parameter associated with the part of code.

12. The method for manufacturing a corrective ophthalmic lens as claimed in claim 1, comprising a part of code for choosing lens contour in the guise of configuration parameter, this part of code comprising, in a graphical interface, means for selecting at least one lens contour from among a preselection of lens contours associated with various spectacle frames, means of graphical simulation of a virtual lens exhibiting the selected contour and means for validating the selection of a lens contour.

13. The method for manufacturing a corrective ophthalmic lens as claimed in claim 1, furthermore comprising a step of presenting the values of the various configuration parameters selected and validated on completion of the execution of said at least one ordered sequence.

14. The method for manufacturing a corrective ophthalmic lens as claimed in claim 1, furthermore comprising a step of verifying the feasibility of a corrective ophthalmic lens in accordance with the values of the various configuration parameters selected and validated on completion of the execution of said at least one ordered sequence.

15. The method for manufacturing a corrective ophthalmic lens as claimed in claim 1, further comprising a step of constructing at least one preselection of values, associated with a configuration parameter.

\* \* \* \* \*